United States Patent
Andreae et al.

(10) Patent No.: US 8,821,342 B2
(45) Date of Patent: Sep. 2, 2014

(54) ACCESSORY DRIVE MOTOR CONFIGURATION

(75) Inventors: Morgan MacKenzie Andreae, Columbus, IN (US); David M. Barnes, Columbus, IN (US); Vivek Anand Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 290 days.

(21) Appl. No.: 13/339,990

(22) Filed: Dec. 29, 2011

(65) Prior Publication Data
US 2012/0225751 A1   Sep. 6, 2012

Related U.S. Application Data

(60) Provisional application No. 61/429,026, filed on Dec. 31, 2010.

(51) Int. Cl.
*B60W 10/02* (2006.01)
*B60W 10/08* (2006.01)

(52) U.S. Cl.
USPC .................................................. 477/5; 477/8

(58) Field of Classification Search
USPC ....................................................... 477/2, 5–8
See application file for complete search history.

(56) References Cited

U.S. PATENT DOCUMENTS

| | | |
|---|---|---|
| 4,489,242 A | 12/1984 | Worst |
| 5,558,173 A | 9/1996 | Sherman |
| 5,635,805 A | 6/1997 | Ibaraki et al. |
| 5,924,406 A | 7/1999 | Kinugasa et al. |
| 5,971,092 A | 10/1999 | Walker |
| 6,026,921 A | 2/2000 | Aoyama et al. |
| 6,251,042 B1 | 6/2001 | Peterson et al. |
| 6,334,079 B1 | 12/2001 | Matsubara et al. |
| 6,396,161 B1 | 5/2002 | Crecelius et al. |
| 6,464,028 B1 | 10/2002 | Imani |
| 6,501,190 B1 | 12/2002 | Seguchi et al. |
| 6,598,496 B2 | 7/2003 | Pannell |
| 6,668,953 B1 | 12/2003 | Reik et al. |
| 6,863,139 B2 | 3/2005 | Egami et al. |
| 7,104,920 B2 | 9/2006 | Beaty et al. |
| 7,119,454 B1 | 10/2006 | Chiao |
| 2003/0116368 A1 | 6/2003 | Winkelman et al. |
| 2007/0225888 A1 | 9/2007 | Morris |
| 2008/0039263 A1 | 2/2008 | Usoro |
| 2008/0051242 A1 | 2/2008 | Usoro |
| 2008/0099256 A1 | 5/2008 | Holmes et al. |
| 2008/0103679 A1 | 5/2008 | Ruiz |
| 2008/0242498 A1 | 10/2008 | Miller et al. |
| 2009/0101465 A1 | 4/2009 | Hart et al. |
| 2009/0171523 A1 | 7/2009 | Luo et al. |
| 2012/0264565 A1* | 10/2012 | Kobayashi ........................ 477/5 |

OTHER PUBLICATIONS

International Search Report and Written Opinion, PCT/US2011/068125, Cummins Inc., US/ISR, May 1, 2012, 8 pgs.

* cited by examiner

*Primary Examiner* — Justin Holmes
(74) *Attorney, Agent, or Firm* — Krieg DeVault LLP (57) ABSTRACT

An accessory drive motor configuration is disclosed. One embodiment of the accessory drive motor configuration is an apparatus including an internal combustion engine having a crankshaft, wherein the crankshaft is structured to provide traction power. The apparatus further includes an accessory drive system operably coupled to a shaft. The shaft is selectively coupled to an electro-mechanical device and selectively coupled to the internal combustion engine. The shaft extends through at least a portion of the electro-mechanical device.

28 Claims, 6 Drawing Sheets

ACCESSORY DRIVE MOTOR CONFIGURATION

RELATED APPLICATIONS

This application is related, and claims the benefit of, U.S. Provisional Patent Application 61/429,026, filed on Dec. 31, 2010, which is incorporated herein by reference for all purposes.

BACKGROUND

The present invention relates to hybrid powertrains, and more specifically, but not exclusively relates to accessory drive techniques for hybrid applications. Environmental concerns and limited natural resources are highlighting the desire for reduced fuel consumption. One promising avenue toward the reduction of fuel consumption is the use of hybrid powertrains. Many hybrid applications utilize a start/stop function to eliminate internal combustion engine idle operation. The start/stop function requires the ability to power accessories when the internal combustion engine is off. The power required to start an internal combustion engine frequently, as is required for a start/stop function, typically requires a large motor. Accordingly, further technological developments are desirable in this area.

SUMMARY

One embodiment is a unique accessory drive motor configuration. Other embodiments include unique methods, systems, and apparatus to provide an efficient packaging for an accessory drive configuration capable of powering accessories when an internal combustion engine is in an off state; in some embodiments the accessory drive motor configuration may also start or aid in the starting of an internal combustion engine. Further embodiments, forms, objects, features, advantages, aspects, and benefits shall become apparent from the following description and drawings.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
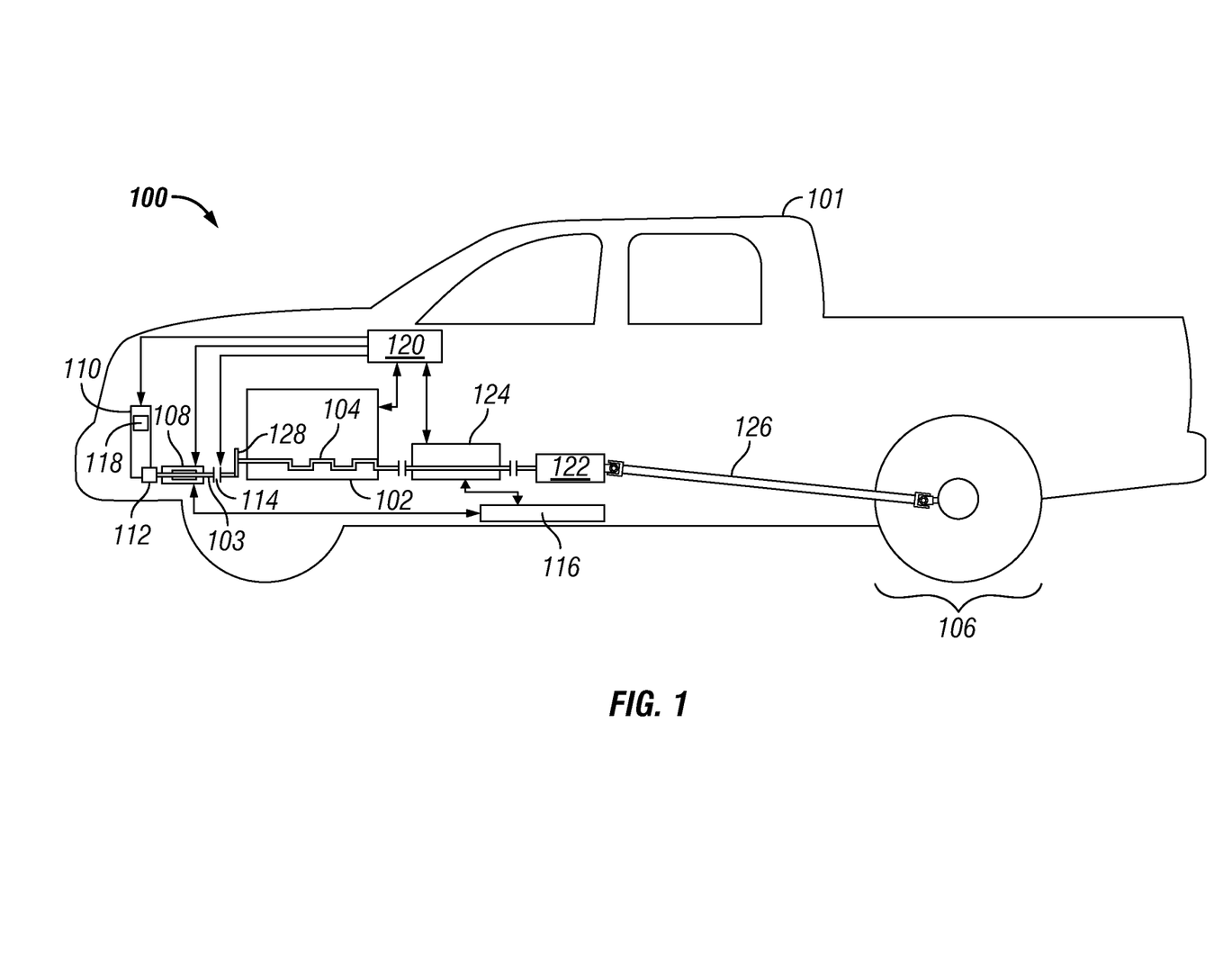
FIG. 1 is a schematic block diagram for an accessory drive motor configuration.

FIG. 1 is a schematic block diagram of a system 100 including an internal combustion engine 102. It is contemplated that the internal combustion engine 102 may be a gasoline engine, a natural gas engine, a rotary engine, and/or an ethanol engine. In one embodiment of the present invention, the internal combustion engine 102 is a diesel engine. The internal combustion engine 102 includes a crankshaft 104. The crankshaft 104 transfers mechanical power from the internal combustion engine 102 to a load 106. It is contemplated that the load 106 is a generator (e.g. a mobile generator unit), a water pump (e.g. a pump truck), and/or a propeller (e.g. for marine applications). FIG. 1 depicts an exemplary load 106 as rear wheels of a vehicle 101, where the internal combustion engine 102 provides power to the load 106 as a part of a hybrid power train. The system 100 further includes a controller 120 structured to functionally execute certain operations for powering an accessory drive system 110 of the system 100. Specific exemplary operations of the controller 120 are described in the section referencing FIG. 4.

The accessory drive system 110 includes at least one accessory 118. It is contemplated that the accessory drive system 110 includes accessories 118 such as an internal combustion engine coolant pump, an air pump, a cooling fan, an alternator, a power steering device, and/or other accessories capable of being included into the accessory drive system 110. In certain embodiments, the accessory drive system 110 is a front end accessory drive (FEAD). Exemplary accessories 118 include a pump, a fan, and/or a compressor.

Figure 2:
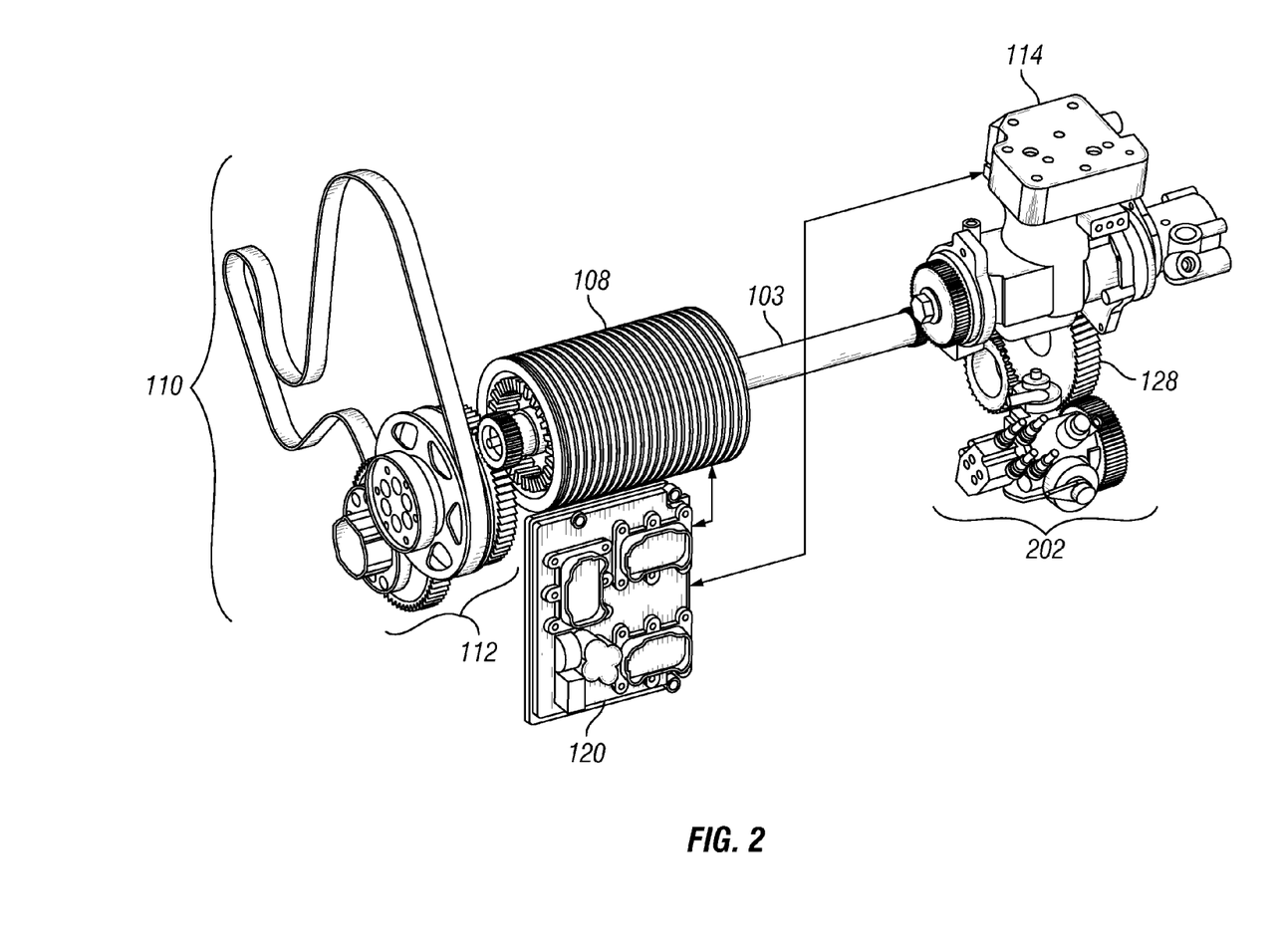
FIG. 2 is a cut away view of an accessory drive motor configuration.

Referencing FIG. 2, a cut away view of an accessory drive motor configuration is shown. The accessory drive system 110 receives torque from at least one of the internal combustion engine 102 and the electro-mechanical device 108. A shaft 103 is operably coupled to the accessory drive system 110 and is structured to transfer torque thereto. The shaft 103 extends from the accessory drive system 110, through at least a portion of the electro-mechanical device 108 and extends to a clutch 114.

In certain embodiments, the shaft 103 extends through a stator of the electro-mechanical device 108. In this embodiment, a rotor may be directly or indirectly attached to the shaft 103. In other embodiments, the shaft 103 may extend through the electro-mechanical device 108 outside of the stator. In these embodiments, the electro-mechanical device 108 may transfer torque to the shaft 103 through the use of a gear, a clutch, a belt, and/or any other torque transfer device known to one of skill in the art. It is contemplated that shaft 103 is a one piece shaft, a multiple piece shaft, a shaft 103 operably coupled to a shaft clutch inside the electro-mechanical device 108, and/or any shaft suitable to transfer torque to power the accessory drive system 110.

The accessory drive system 110 includes a torque transfer device to transfer torque from the shaft 103 to the at least one accessory 118. The torque transfer device can be a belt, a chain, a gear train, and/or any other device capable of transferring torque from the shaft 103 to the at least one accessory 118.

In certain embodiments, the accessory drive system 110 is coupled, through a gear assembly 112, to the shaft 103. The electro-mechanical device 108 selectively couples with the gear assembly 112 and the accessory drive system 110—for example with a clutch mechanism in the electro mechanical device 108 (not shown), or by selectively powering one of an electro-magnetic field within the electro-mechanical device 108 or an electro-magnet within the electro-mechanical device 108. The described selective coupling operations of the electro-mechanical device 108 are exemplary and non-limiting.

The internal combustion engine 102 selectively couples with the gear assembly 112 and the accessory drive system 110—for example with a clutch 114 that engages or disengages the internal combustion engine 102 power output to the shaft 103 and thereby the gear assembly 112 and accessory drive system 110. The illustrated accessory drive system 110 of FIG. 2 includes a gear assembly 112, but embodiments without a gear assembly are also contemplated herein.

Figure 3:
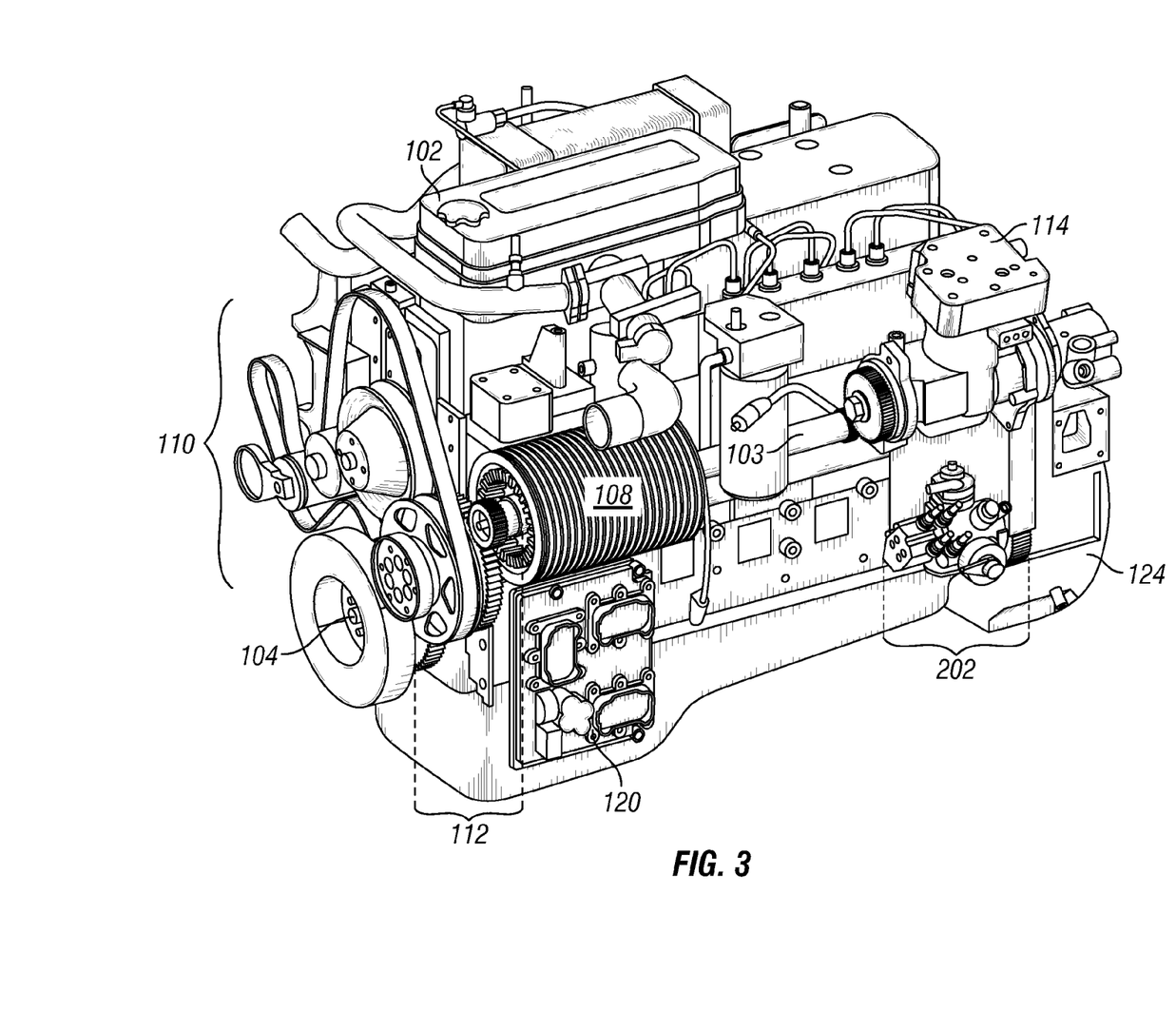
FIG. 3 is a cut away view of an accessory drive motor configuration including an internal combustion engine assembly.

Referencing FIG. 3 (and FIG. 2 for clarity of individual components), the internal combustion engine 102 is selectively coupled to the accessory drive system 110 by the shaft 103 passing through the electro-mechanical device 108. The electro-mechanical device 108 may allow for the transfer of torque from the internal combustion engine 102 to the accessory drive system 110 through the electro-mechanical device 108 by creating a neutral magnetic field between a rotor of the electro-mechanical device 108 (a rotor input shaft being connected to the accessory drive system 110 and a rotor output shaft extending toward the rear accessory drive system 202) and a stator of the electro-mechanical device 108. In an exemplary embodiment, the rotor input shaft and the rotor output shaft form a portion of the shaft 103. The neutral magnetic field may be created by preventing a flow of electricity through electro-magnets in the stator and/or rotor, by magnetically shielding semi-permanent or permanent magnets, or by any other operation to create a neutral magnetic field known to one of ordinary skill in the art.

The electro-mechanical device 108 may generate electricity as torque is transferred from the internal combustion engine 102, through the electro-mechanical device 108, to the accessory drive system 110. The amount of electricity generated and the torque losses during the transfer of torque through the electro-mechanical device 108 may be proportional or have a non-linear relationship as understood in the art. The amount of electricity generated may be controlled through the alteration of the magnetic field. The electro-mechanical device 108 may also use electricity from an electrical energy storage device 116 to eliminate torque losses through the electro-mechanical device 108.

The exemplary clutch 114 is disposed between the internal combustion engine 102 and the electro-mechanical device 108. The engagement or disengagement of clutch 114, combined with operations to couple and decouple the electro-mechanical device 108 with the shaft 103, allows for the selective coupling of the internal combustion engine 102 or the electro-mechanical device 108, respectively, to the accessory drive system 110.

Returning to FIG. 1, an exemplary electro-mechanical device 108 is a motor/generator electrically coupled to the electrical energy storage device 116. In certain additional or alternative embodiments, the electro-mechanical device 108 is an asynchronous motor/generator, an induction motor, an induction motor/generator, a synchronous motor/generator, a synchronous motor, and/or any other device capable of converting electrical energy into mechanical energy, and/or converting mechanical energy into electrical energy.

In certain embodiments, the electro-mechanical device 108 selectively engages the crankshaft 104. The electro-mechanical device 108 may alternatively or additionally be selectively coupled to the internal combustion engine 102 by engaging a camshaft, a power take off shaft, and/or a flywheel 128. In certain further embodiments, the electro-mechanical device 108 provides torque to the internal combustion engine 102 and/or the load 106 by providing torque to the crankshaft 104. An exemplary electro-mechanical device 108 provides regenerative braking by operating the electro-mechanical device 108 as a generator, and applying a load to the crankshaft 104 and producing electricity.

The produced electricity may be stored in an electrical energy storage device 116, utilized for a present electrical energy need, and/or dissipated. The exemplary system 100 includes an electrical energy storage device 116. The electrical energy storage device 116 may be any type of electrical energy storage device 116 understood in the art. In certain embodiments, the electrical energy storage device 116 includes a nickel metal hydride battery, a lithium-ion battery, and/or a fuel cell. In certain embodiments, energy may be stored non-electrically, for example in a high performance flywheel, in a compressed air tank, and/or through deflection of a high capacity spring. Where the energy is stored electrically, any electrical energy storage device 116 is contemplated herein, including without limitation a lead-acid battery, a cadmium battery, a hyper-capacitor, and/or an ultra-capacitor. In an exemplary embodiment, the internal combustion engine 102, the electro-mechanical device 108 (acting as a motor/generator), and the electrical energy storage device 116 may be configured in a parallel hybrid configuration. It is further contemplated that vehicle 101, the electrical energy storage device 116, the internal combustion engine 102, and the electro-mechanical device may be configured as a series-parallel hybrid, a series hybrid including an additional traction motor, and/or any other hybrid configuration known to one of ordinary skill in the art.

The system 100 includes a transmission 122 selectively coupled to the internal combustion engine 102, and positioned between the crankshaft 104 and the load 106. The exemplary system 100 further includes a traction motor 124. The traction motor 124 is a motor or motor/generator that is selectively coupled to the transmission 122 of the vehicle 101 to provide torque to the load 106. In certain embodiments, the traction motor 124 may also convert torque from the load 106 to electrical energy during regenerative braking and/or to reenergize the electrical energy storage device 116. The traction motor 124 is illustrated as in-line with the drivetrain, although the traction motor 124, where present, may mechanically engage a power splitter, the transmission 122, or other device. The traction motor 124 in-line with the drivetrain may be in a series, parallel, series-parallel, or other hybrid power train configuration with the internal combustion engine 102. In certain embodiments, where the traction motor 124 is in a series configuration with the internal combustion engine 102, the traction motor 124 and/or a generator (not shown) electrically coupled to the electrical energy storage device 116 operate as the load 106, and the crankshaft does not mechanically couple to the drive wheels or other downstream load from the traction motor 124.

In some embodiments, gear assembly 112 may be interposed between the electro-mechanical device 108 and the internal combustion engine 102. The gear assembly 112 provides a selectable ratio of torque/speed between the electro-mechanical device 108 and the internal combustion engine 102. In an exemplary embodiment, the gear assembly 112 allows the electro-mechanical device 108 to rotate the internal combustion engine 102 at a slower revolution speed than the electro-mechanical device 108 is revolving. In certain embodiments, the second gear assembly allows the electro-mechanical device 108 to start the internal combustion engine 102, and/or to run both the internal combustion engine 102 and the electro-mechanical device 108 at different operating speeds even while the clutch 114 is engaged. The second gear assembly may further include a clutch, a transmission, and/or any other device to allow a speed input and speed output of a gear train to vary. Furthermore, while the term gear assembly is used, any means of transferring torque, including a shaft, a belt, a chain, and/or any other device known to one of ordinary skill in the art is contemplated herein.

Referencing FIGS. 2 and 3, a rear accessory drive system 202 may be mechanically coupled to the internal combustion engine 102. In an exemplary embodiment, the rear accessory drive system 202 includes an accessory, the accessory being an air compressor, a refrigeration compressor, and/or a hydraulic pump. It is also contemplated that the rear accessory drive system 202 includes a dual tank air compressor (e.g. to be utilized for air brakes), a single tank air compressor, a hydraulic pump, a pneumatic pump, a water pump (e.g. in a pump truck), and/or any other accessory which may be included in a rear accessory drive system 202. The rear accessories may be gear driven from the internal combustion engine 102, or may use any other torque transfer device to receive torque from the internal combustion engine.

Referencing FIG. 1, in another embodiment of the present invention, an internal combustion engine 102 includes a crankshaft 104. The system 100 further includes a transmission 122 and a drive shaft 126 that transfer torque from the crankshaft 104 to provide traction power to a vehicle 101. A traction motor 124 may be selectively coupled to the transmission 122 to provide traction power to augment the traction power provided by the internal combustion engine 102. An accessory drive system 110 is selectively coupled to an electro-mechanical device 108. The accessory drive system 110 is selectively coupled to the internal combustion engine 102 through the electro-mechanical device 108.

In certain embodiments, the system 100 further includes a controller 120 structured to perform certain operations to control the accessory drive configuration. In certain embodiments, the controller 120 forms a portion of a processing subsystem including one or more computing devices having memory, processing, and communication hardware. The controller 120 may be a single device or a distributed device, and the functions of the controller 120 may be performed by hardware or software. In certain embodiments, the controller includes one or more modules structured to functionally execute the operations of the controller 120. In certain embodiments, the controller 120 includes an accessory power determination module, an accessory drive selection module, and may further include a rear accessory drive selection module.

The description herein including modules emphasizes the structural independence of the aspects of the controller 120, and illustrates one grouping of operations and responsibilities of the controller 120. Other groupings that execute similar overall operations are understood within the scope of the present application. Modules may be implemented in hardware and/or software on computer readable medium, and modules may be distributed across various hardware or software components. More specific descriptions of certain embodiments of controller 120 operations are included in the section referencing FIG. 4.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 4:
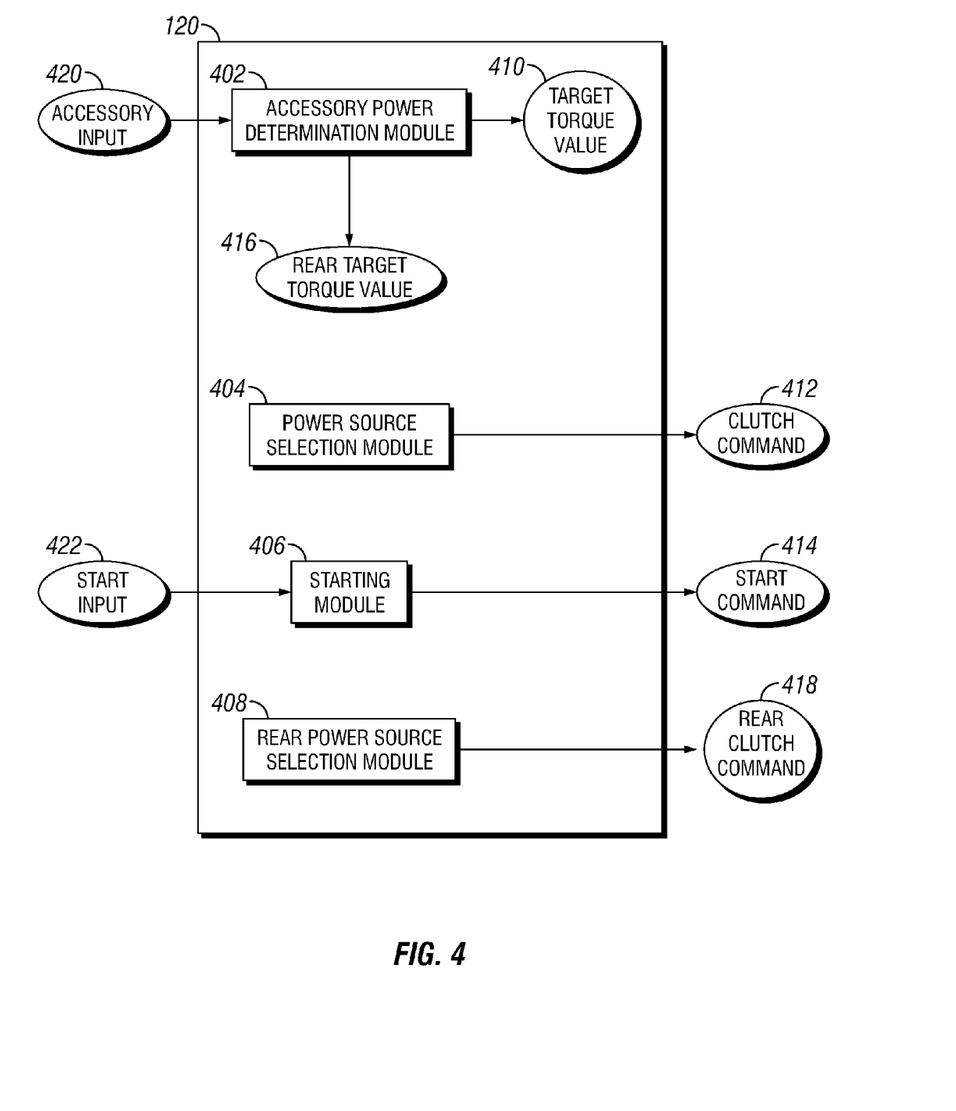
FIG. 4 is a schematic block diagram of a controller that functionally executes certain operations for the accessory drive motor configuration.

Referencing FIG. 4, an exemplary controller 120 includes an accessory power determination module 402, a power source selection module 404, a starting module 406, and a rear power source selection module 408. Specific embodiments of the controller 120 may omit certain modules or have additional modules, as will be understood by the description herein and the claims following. Operations described are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

In one embodiment of the present invention an accessory power determination module 402 receives an accessory input 420. The accessory input 420 includes any information known in the art that the accessory power determination module 402 may utilize to determine a target torque value 410 for an accessory drive system 110 and/or a rear accessory drive system 202. Exemplary and non-limiting examples of the accessory input 420 include a value indicating that accessories are presently operating, a list of accessories that are presently operating, a total torque required (or estimated) to operate the presently operating accessories, and/or any other indication known in the art by which the accessory power determination module 402 determines which accessories are active and/or what amount of torque is presently required to operate the active accessories. An exemplary target torque value 410 may be determined from a power requirement and a reference speed, where the reference speed is a current speed of the engine and/or electro-mechanical device that will provide the power requirement with the target torque value 410.

In one example, the accessory power determination module 402 determines the target torque value 410 in response to the accessory input 420. An exemplary target torque value 410 is a minimum torque to functionally power the accessory drive system 110. An exemplary accessory power determination module 402 determines the minimum torque to power the accessory drive system 110 by interpolating values in a look-up table including various accessories and the torque requirements of each of the various accessories. Additional or alternative embodiments of the accessory power determination module 402 determine the minimum torque based on the accessory drive system 110 speed, based on the current torque (or power) demands of the accessories, and/or through the use of active feedback mechanisms from one or more of the accessories to provide the torque requirement of the accessories.

The controller 120 includes a power source selection module 404 that selects one of the internal combustion engine 102 and the electro-mechanical device 108 to provide torque to the accessory drive system 110, in response to the target torque value 410. The internal combustion engine 102 and/or the electro-mechanical device 108 may be selected by the power source selection module 404 providing a clutch command 412. The clutch 114, located between the internal combustion engine 102 and the electro-mechanical device 108, is responsive to the clutch command 412. The clutch command 412 can signal the clutch 114 to either engage or disengage. The clutch command 412 signaling the clutch 114 to engage connects the internal combustion engine 102 with the electro-mechanical device 108. The torque from the internal combustion engine 102 passes through the electro-mechanical device 108, via the shaft passing therethrough, to power the accessory drive system 110. The clutch command 412 signaling the clutch 114 to disengage disconnects the internal combustion engine 102 from shaft passing through the electro-mechanical device 108 and coupled to the accessory drive system 110. Accordingly, the electro-mechanical device 108 can re-couple with the shaft and power the accessory drive system 110.

An exemplary operation to select the internal combustion engine 102 to power the accessory drive system 110 includes selecting the internal combustion engine 102 as the accessory power source when the internal combustion engine 102 is in an on state. Exemplary, non-limiting examples of conditions when the internal combustion engine 102 may drive the accessory drive system 110 include when the internal combustion engine 102 is at a normal operational temperature and is operating at a minimum RPM for a specific gear, when the vehicle 101 is traveling on a downward incline, when the electrical energy storage device 116 does not have a sufficient charge to power the accessory drive system 110, and/or under any conditions at which it is more desirable to power the accessory drive system 110 with the internal combustion engine 102 rather than the electro-mechanical device 108.

The controller 120 includes a starting module 406 that provides a start command 414 to the electro-mechanical device 108 in response to a start input 422. The start input 422 may result from: a key switch signal, a signal from a push-button or other user input device, an accelerator pedal position indicating that internal combustion engine 102 power will be required, a brake pedal signal indicating that internal combustion engine 102 power will be required, and/or any other signal understood in the art to indicate that internal combustion engine 102 power is required or will be required. In response to the start command 414 the electro-mechanical device 108 engages the internal combustion engine 102, for example at a flywheel 128, thereby providing torque to the crankshaft 104 of the internal combustion engine 102 and turning over the engine 102.

The accessory power determination module 402 may also determine a rear target torque value 416 if one or more rear accessories require torque in the rear accessory drive 202. The rear target torque value 416 may be determined by the accessory power determination module 402 using the same operations and methodology as aforementioned in determining the target torque value 410. A rear power source selection module 408 may send a rear clutch command 418 in response to the rear target torque value 416. The rear clutch command 418 selects one of the internal combustion engine 102 and the electro-mechanical device 108 to provide torque to the rear accessory drive system 202. The determination of powering the rear accessory drive system 202 with the electro-mechanical device 108 or the internal combustion engine 102 may be based on an efficiency comparison.

The descriptions which follow provide illustrative embodiments of performing procedures for providing torque to accessories. Operations described are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 5:
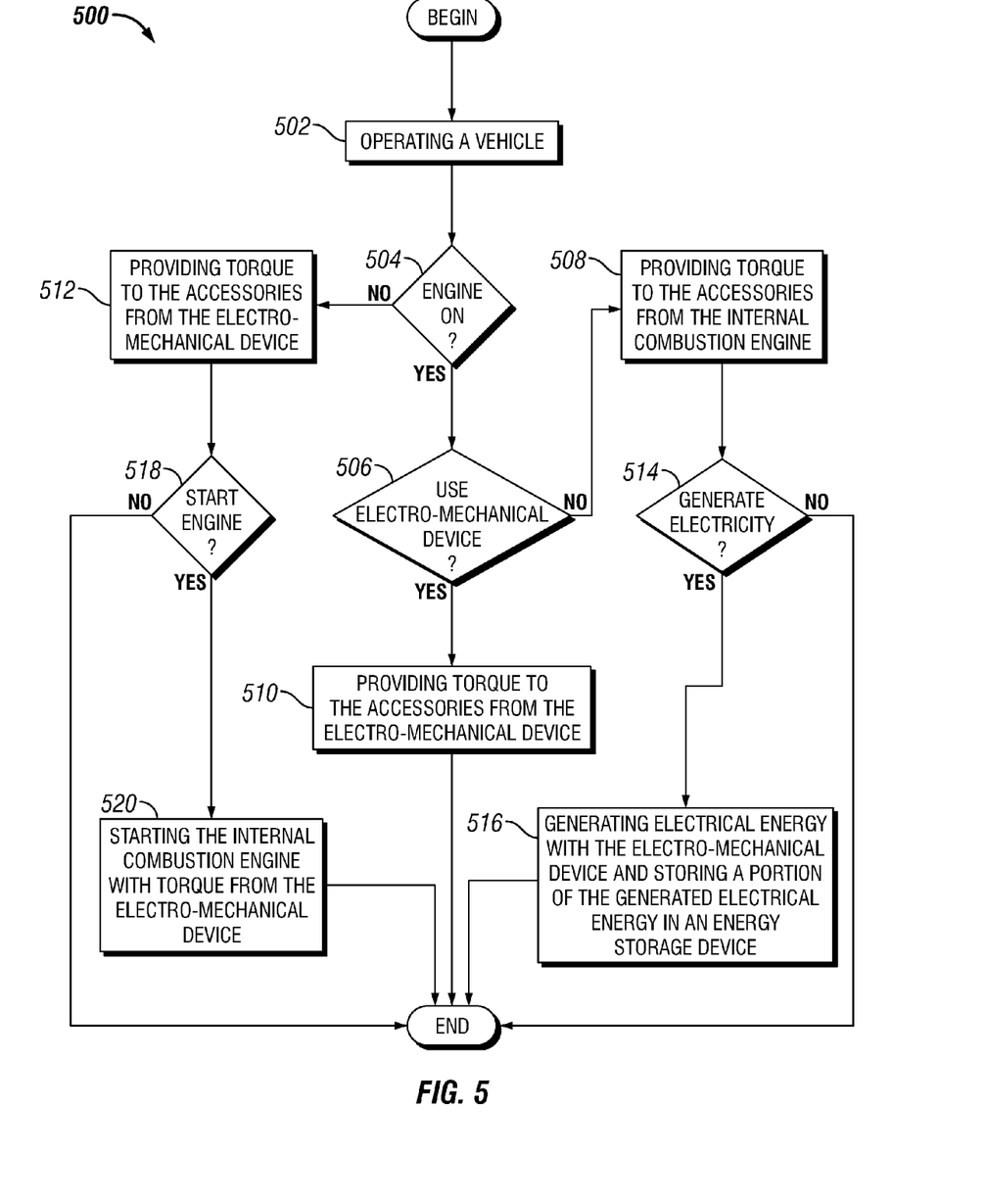
FIG. 5 is a schematic flow diagram of a procedure for an accessory drive motor configuration.

FIG. 5 is an exemplary procedure 500 that includes an operation 502 of operating a vehicle. A determination operation 504 determines if the internal combustion engine is in an INTERNAL COMBUSTION ENGINE ON state. In response to the determination operation 504 having a NO output, an operation 512 provides torque to the accessories from the electro-mechanical device. A determination operation 518 determines whether to START INTERNAL COMBUSTION ENGINE. In response to the determination operation 518 having a NO output, the procedure 500 ends. In response to the determination operation 518 having a YES output, an operation 520 starts the internal combustion engine with torque from the electro-mechanical device. In response to the determination operation 504 having a YES output, a determination operation 506 determines whether to USE ELECTRO-MECHANICAL DEVICE to power the accessories.

In response to the determination operation 506 having a YES output, an operation 510 provides torque to the accessories from the electro-mechanical device. In response to the determination operation 506 having a NO output, an operation 508 provides torque to the accessories from the internal combustion engine. A determination operation 514 determines whether to GENERATE ELECTRICITY utilizing the electro-mechanical device as a generator. In response to the determination operation 514 having a NO output, the procedure 500 ends. In response to the determination operation 514 having a YES output, an operation 516 generates electrical energy with the electro-mechanical device, stores a portion of the generated electrical energy in an energy storage device, and/or provides the generated electrical energy to a current load in the vehicle system.

Figure 6:
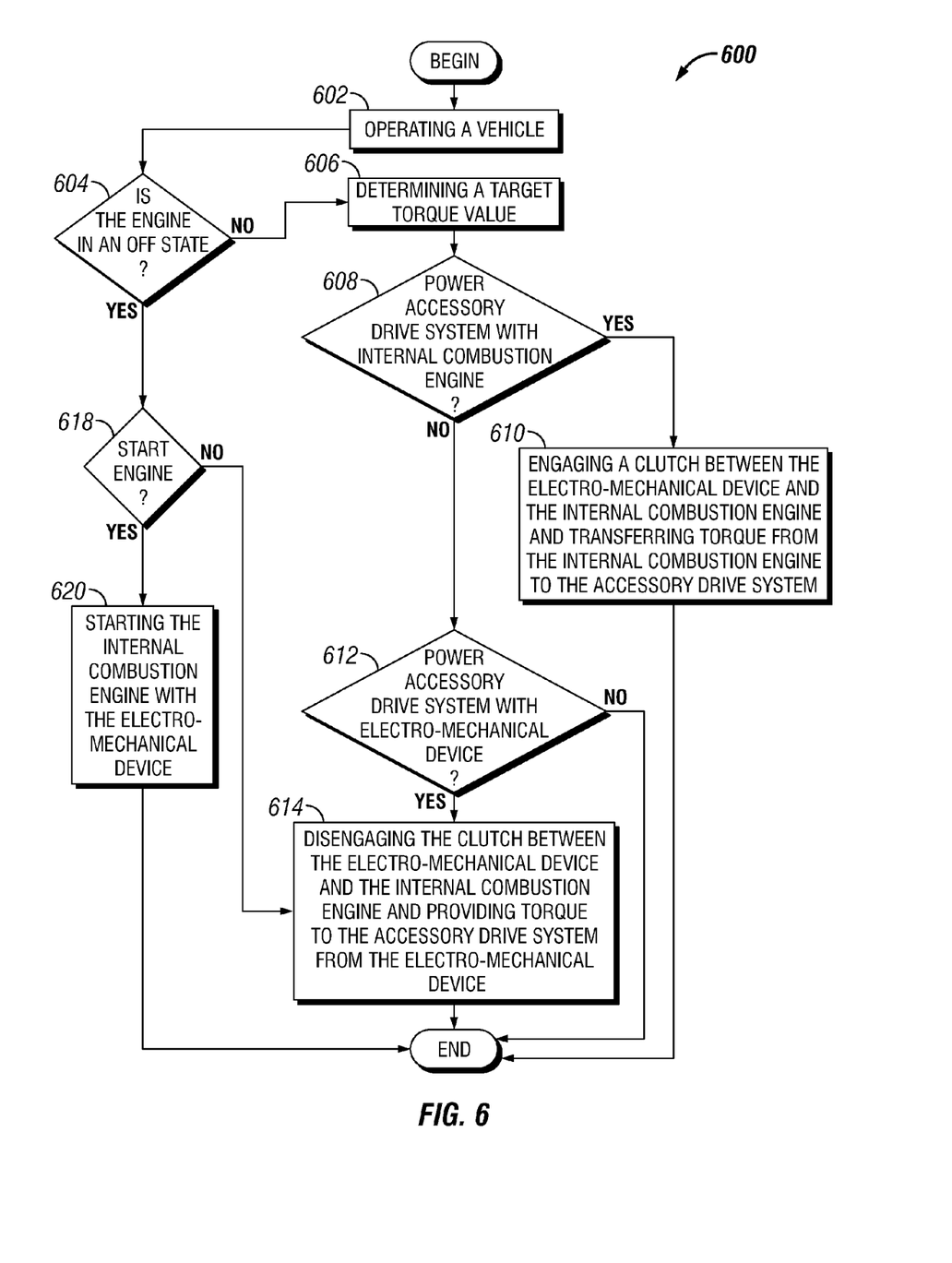
FIG. 6 is a schematic flow diagram of a procedure for an accessory drive motor configuration.

FIG. 6 is an exemplary procedure 600 that includes an operation 602 of operating a vehicle. A determination operation 604 determines IS THE INTERNAL COMBUSTION ENGINE IN AN OFF STATE. In response to the determination operation 604 having a YES output, a determination operation 618 determines whether to START INTERNAL COMBUSTION ENGINE. In response to the determination operation 618 having a YES output, an operation 620 starts the internal combustion engine with the electro-mechanical device. In response to the determination operation 618 having a NO output, an operation 614 disengages the clutch between the electro-mechanical device and the internal combustion engine and provides torque to the accessory drive system from the electro-mechanical device.

In response to the determination operation 604 having a NO output, an operation 606 determines a target torque value for the accessory drive system. A determination operation 608 determines whether to POWER ACCESSORY DRIVE SYSTEM WITH INTERNAL COMBUSTION ENGINE. In response to the determination operation 608 having a YES output, an operation 610 engages a clutch between the electro-mechanical device and the internal combustion engine and transfers torque from the internal combustion engine to the accessory drive system. In response to the determination operation 608 having a NO output, determination operation 612 determines whether to POWER ACCESSORY DRIVE SYSTEM WITH ELECTRO-MECHANICAL DEVICE. In response to the determination operation having a YES output, an operation 614 disengages the clutch between the electro-mechanical device and the internal combustion engine and provides torque to the accessory drive system from the electro-mechanical device. In response to the determination operation 612 having a NO output, the procedure 600 will end.

As is evident from the figures and text presented above, a variety of embodiments according to the present invention are contemplated. An exemplary set of embodiments is a system including an internal combustion engine having a crankshaft, the crankshaft mechanically coupled to a load. The system further includes a controller including a power source selection module which is structured to select one of the internal combustion engine and an electro-mechanical device to provide torque to a shaft. The shaft is operably coupled to an accessory drive system to transfer torque thereto and wherein the shaft extends through a stator of the electro-mechanical device.

An exemplary internal combustion engine is a diesel internal combustion engine. An exemplary accessory drive system includes at least one accessory selected from the group of accessories including a pump, a fan, and a compressor. In certain embodiments, the system further includes a clutch between the internal combustion engine and the electro-mechanical device. In certain embodiments, the electro-mechanical device is a motor/generator electrically coupled to an electrical energy storage device. In yet further embodiments, the electrical energy storage device includes an electrical energy storage device selected from the group of electrical energy storage devices including a nickel metal hydride battery, a lithium-ion battery, and a fuel cell.

An exemplary system further includes the electro-mechanical device being selectively engaged to the crankshaft. In certain embodiments, the internal combustion engine, the motor/generator, and the electrical energy storage device are operably coupled in a parallel hybrid configuration.

An exemplary system further includes a transmission selectively coupled to the internal combustion engine, a traction motor selectively coupled to the transmission, and wherein the traction motor is structured to selectively provide torque to the load. In certain embodiments, the system includes a gear assembly interposed between the electro-mechanical device and the internal combustion engine. In certain embodiments, the system includes a rear accessory drive system mechanically coupled to the internal combustion engine. In further embodiments, the rear accessory drive system includes at least one accessory selected from the group of accessories including an air compressor, a refrigeration compressor, and a hydraulic pump.

Another exemplary set of embodiments is an apparatus including an internal combustion engine having a crankshaft, the crankshaft structured to provide traction power. The apparatus further includes an accessory drive system operably coupled to a shaft. The shaft is selectively coupled to an electro-mechanical device and selectively coupled to the internal combustion engine. The shaft extends through at least a portion of the electro-mechanical device.

In certain embodiments, the apparatus includes an accessory power determination module that is structured to determine a target torque value for the accessory drive system. An exemplary apparatus further includes a power source selection module structured to select one of the internal combustion engine and the electro-mechanical device to provide torque to the accessory drive system in response to the target torque value. An exemplary apparatus further includes a starting module structured to send a start command to the electro-mechanical device, and in response to the start command the electro-mechanical device engages a flywheel providing torque to the crankshaft and thereby starting the internal combustion engine.

In certain embodiments, the power source selection module is further structured to select one of the internal combustion engine and the electro-mechanical device by sending a clutch command, the apparatus further comprising a clutch between the internal combustion engine and electro-mechanical device, wherein the clutch is responsive to the clutch command. In certain embodiments, the accessory power determination module is further structured to determine a rear target torque value for a rear accessory drive system. In further embodiments, the apparatus further includes a rear power source selection module that is structured to send a rear clutch command in response to the rear target torque value, the rear clutch command selecting one of the internal combustion engine and the electro-mechanical device to provide torque to the rear accessory drive system.

An exemplary apparatus further includes a transmission operably coupled to the internal combustion engine. In further embodiments, a traction motor is operably coupled to the transmission and the traction motor is structured to provide the traction power.

Another exemplary set of embodiments is an apparatus including an internal combustion engine having a crankshaft, the crankshaft mechanically coupled to a load. The apparatus further includes means for selecting one of the internal combustion engine and an electro-mechanical device to provide torque to an accessory drive system. The apparatus further includes means for transferring torque from the internal combustion engine through the electro-mechanical device and to the accessory drive system.

In certain embodiments, the system includes means for determining a target torque value for the accessory drive system. In further embodiments, the system includes means for providing torque to the accessory drive system in response to the target torque value. In certain embodiments, the system includes means for transferring torque from the electro-mechanical device to start the internal combustion engine.

Another exemplary set of embodiments is a method that includes operating a vehicle including a hybrid drivetrain structured to provide torque to one or more accessories, the hybrid drivetrain including an internal combustion engine with one or more reciprocating pistons and an electro-mechanical device, and wherein the internal combustion engine further includes a crankshaft coupled to a load. The method further includes in a first mode of operation, providing torque to the accessories from the internal combustion engine. The providing torque to the accessories from the internal combustion engine further includes transferring the torque from the internal combustion engine to a shaft, the shaft extending through the electro-mechanical device, and transferring the torque from the shaft to the accessories. The method further includes in a second mode of operation, providing torque to the accessories from the electro-mechanical device while the internal combustion engine is in an on state.

In certain embodiments, in a third mode of operation, the method further includes providing torque to the accessories from the electro-mechanical device while the internal combustion engine is in an off state. In certain embodiments, the electro-mechanical device is of a motor/generator form, wherein the method further includes generating electrical energy with the motor/generator and storing at least a portion of the generated electrical energy in an energy storage device. In certain embodiments, the method further includes starting the internal combustion engine with torque from the electro-mechanical device.

Another exemplary set of embodiments is a method that includes operating a vehicle including an internal combustion engine having a crankshaft coupled to a load and an accessory drive system selectively coupled the internal combustion engine. The method further includes determining a target torque value for the accessory drive system. The method further includes, in response to the target torque value, determining to power the accessory drive system with one of the electro-mechanical device and the internal combustion engine. The method further includes in response to determining to power the accessory drive system with the internal combustion engine, engaging a clutch between the electro-mechanical device and the internal combustion engine, transferring torque from the internal combustion engine to a shaft which extends through the electro-mechanical device, and transferring torque from the shaft to the accessory drive system.

In certain embodiments, the method further includes, in response to determining to power the accessory drive system with the electro-mechanical device, disengaging the clutch between the electro-mechanical device and the internal combustion engine, and providing torque to the accessory drive system from the electro-mechanical device. In certain embodiments, the method further includes determining the internal combustion engine is in an off state. In further embodiments, in response to the internal combustion engine being in an off state, the method further includes disengaging the clutch between the electro-mechanical device and the internal combustion engine. In yet further embodiments, the method includes providing torque from the electro-mechanical device to power the accessory drive system.

In certain embodiments, the method includes determining the internal combustion engine is in an off state. In further embodiments, the method includes in response to determining the internal combustion is in an off state, starting the internal combustion engine with the electro-mechanical device.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine having a crankshaft extending from a rear of the engine, the crankshaft mechanically coupled to a load;
   a controller including a power source selection module structured to select one of the internal combustion engine and an electro-mechanical device to provide torque to a shaft;
   wherein the shaft is operably coupled to an accessory drive system at a front of the engine to transfer torque thereto; and
   wherein the shaft extends through a stator of the electro-mechanical device and is operably connected to the crankshaft at the rear of the engine and the accessory drive system at the front of the engine.

2. The system of claim 1, wherein the internal combustion engine is a diesel engine.

3. The system of claim 1, wherein the accessory drive system includes at least one accessory selected from the group of accessories consisting of a pump, a fan, and a compressor.

4. The system of claim 1, further comprising a clutch between the internal combustion engine and the electro-mechanical device.

5. The system of claim 1, wherein the electro-mechanical device is a motor/generator electrically coupled to an electrical energy storage device.

6. The system of claim 5, wherein the electrical energy storage device includes an electrical energy storage device selected from the group of electrical energy storage devices consisting of a nickel metal hydride battery, a lithium-ion battery, and a fuel cell.

7. The system of claim 5, wherein the internal combustion engine, the motor/generator, and the electrical energy storage device are operably coupled in a parallel hybrid configuration.

8. The system of claim 1, wherein the electro-mechanical device is selectively engaged to the crankshaft.

9. The system of claim 1, further comprising:
   a transmission selectively coupled to the internal combustion engine;
   a traction motor selectively coupled to the transmission; and
   wherein the traction motor is structured to selectively provide torque to the load.

10. The system of claim 1, further comprising a gear assembly, wherein the gear assembly is interposed between the electro-mechanical device and the internal combustion engine.

11. The system of claim 1, further comprising a rear accessory drive system mechanically coupled to the internal combustion engine.

12. The system of claim 11, wherein the rear accessory drive system comprises at least one accessory selected from the group of accessories consisting of an air compressor, a refrigeration compressor, and a hydraulic pump.

13. An apparatus, comprising:
    an internal combustion engine having a crankshaft extending from a rear of the engine, the crankshaft structured to provide traction power;
    an accessory drive system at a front of the engine operably coupled to a shaft;
    wherein the shaft is selectively coupled to an electro-mechanical device, and selectively coupled to the internal combustion engine; and
    wherein the shaft extends through at least a portion of the electro-mechanical device and is operably connected to the crankshaft at the rear of the engine and the accessory drive system at the front of the engine.

14. The apparatus of claim 13, further comprising:
    an accessory power determination module structured to determine a target torque value for the accessory drive system;
    a power source selection module structured to select one of the internal combustion engine and the electro-mechanical device to provide torque to the accessory drive system in response to the target torque value; and a starting module structured to send a start command to the electro-mechanical device, and in response to the start command the electro-mechanical device engages a flywheel providing torque to the crankshaft and thereby starting the internal combustion engine.

15. The apparatus of claim 14, wherein the power source selection module is further structured to select one of the internal combustion engine and the electro-mechanical device by sending a clutch command, the apparatus further comprising a clutch between the internal combustion engine and electro-mechanical device, wherein the clutch is responsive to the clutch command.

16. The apparatus of claim 14, wherein the accessory power determination module is further structured to determine a rear target torque value for a rear accessory drive system, the apparatus further comprising a rear power source selection module structured to send a rear clutch command in response to the rear target torque value, the rear clutch command selecting one of the internal combustion engine and the electro-mechanical device to provide torque to the rear accessory drive system.

17. The apparatus of claim 13, further comprising a transmission operably coupled to the internal combustion engine, and a traction motor operably coupled to the transmission, wherein the fraction motor is structured to provide traction power.

18. A system, comprising:
an internal combustion engine having a crankshaft extending from a rear of the engine, the crankshaft mechanically coupled to a load;
means for selecting one of the internal combustion engine and an electro-mechanical device to provide torque to an accessory drive system at a front of the engine; and
means for transferring torque from the internal combustion engine through the electro-mechanical device and to the accessory drive system.

19. The system of claim 18, further comprising:
means for determining a target torque value for the accessory drive system; and
means for providing torque to the accessory drive system in response to the target torque value.

20. The system of claim 18, further comprising means for transferring torque from the electro-mechanical device to start the internal combustion engine.

21. A method, comprising:
operating a vehicle including a hybrid drivetrain structured to provide torque to one or more accessories, the hybrid drivetrain including an internal combustion engine with one or more reciprocating pistons and an electro-mechanical device, wherein the internal combustion engine further includes a crankshaft extending from a rear of the engine coupled to a load;
in a first mode of operation, providing torque to the accessories at a front of the engine from the internal combustion engine;
wherein the providing torque to the accessories from the internal combustion engine further comprises transferring the torque from the internal combustion engine to the accessories through a shaft which extends through the electro-mechanical device and is operably connected to the crankshaft at the rear of the engine and the accessory drive system at the front of the engine; and
in a second mode of operation, providing torque to the accessories from the electro-mechanical device while the internal combustion engine is in an on state.

22. The method of claim 21, further comprising, in a third mode of operation, providing torque to the accessories from the electro-mechanical device while the internal combustion engine is in an off state.

23. The method of claim 21, wherein the electro-mechanical device is of a motor/generator form, wherein the method further includes generating electrical energy with the motor/generator and storing at least a portion of the generated electrical energy in an energy storage device.

24. The method of claim 21, further comprising starting the internal combustion engine with torque from the electro-mechanical device.

25. A method, comprising:
operating a vehicle including an internal combustion engine having a crankshaft extending from a rear of the engine coupled to a load and an accessory drive system at a front of the engine selectively coupled the internal combustion engine;
determining a target torque value for the accessory drive system;
in response to the target torque value, determining to power the accessory drive system with one of the electro-mechanical device and the internal combustion engine; and
in response to determining to power the accessory drive system with the internal combustion engine:
engaging a clutch interposed between the electro-mechanical device and the internal combustion engine; and
transferring torque from the internal combustion engine to the accessory drive system through a shaft which extends through the electro-mechanical device and is operably connected to the crankshaft at the rear of the engine and the accessory drive system at the front of the engine.

26. The method of claim 25, wherein in response to determining to power the accessory drive system with the electro-mechanical device, disengaging the clutch between the electro-mechanical device and the internal combustion engine, and providing torque to the accessory drive system from the electro-mechanical device.

27. The method of claim 25, further comprising:
determining the internal combustion engine is in an off state;
in response to the internal combustion engine being in the off state, disengaging the clutch between the electro-mechanical device and the internal combustion engine; and
providing torque from the electro-mechanical device to power the accessory drive system.

28. The method of claim 25, further comprising:
determining the internal combustion engine is in an off state; and
in response to the determining the internal combustion is in the off state, starting the internal combustion engine with the electro-mechanical device.

* * * * *